(12) United States Patent
Schulze et al.

(10) Patent No.: US 9,909,463 B2
(45) Date of Patent: Mar. 6, 2018

(54) HYDRAULIC VALVE AND CAM PHASER

(71) Applicant: Hilite Germany GmbH, Marktheidenfeld (DE)

(72) Inventors: Dietmar Schulze, Muenzenberg (DE); Christian Scheibe, Mannheim (DE)

(73) Assignee: Hilite Germany GmbH, Marktheidenfeld (DE)

( * ) Notice: Subject to any disclaimer, the term of this patent is extended or adjusted under 35 U.S.C. 154(b) by 97 days.

(21) Appl. No.: 14/848,456

(22) Filed: Sep. 9, 2015

(65) Prior Publication Data

US 2016/0230612 A1    Aug. 11, 2016

Related U.S. Application Data

(63) Continuation of application No. PCT/EP2014/055232, filed on Mar. 17, 2014.

(30) Foreign Application Priority Data

May 3, 2013 (DE) .................. 10 2013 104 573

(51) Int. Cl.
| | |
|---|---|
| *F01L 1/34* | (2006.01) |
| *F01L 1/344* | (2006.01) |
| *F16K 15/02* | (2006.01) |
| *F16K 15/04* | (2006.01) |
| *F16K 31/122* | (2006.01) |

(52) U.S. Cl.
CPC ......... *F01L 1/3442* (2013.01); *F16K 15/023* (2013.01); *F16K 15/042* (2013.01); *F16K 31/122* (2013.01); *F01L 2001/34426* (2013.01)

(58) Field of Classification Search
CPC ............................................. F01L 2001/34426
USPC ...................................................... 123/90.17
See application file for complete search history.

(56) References Cited

U.S. PATENT DOCUMENTS

| | | | |
|---|---|---|---|
| 8,726,866 B1 * | 5/2014 | Lichti ....................... | F01L 1/34 123/90.15 |
| 8,733,305 B2 * | 5/2014 | Scheidig ............... | F01L 1/3442 123/90.17 |
| 2005/0056249 A1 * | 3/2005 | Heinze ................... | F01L 1/022 123/294 |
| 2008/0264200 A1 * | 10/2008 | Hoppe ..................... | F01L 1/34 74/568 R |

(Continued)

FOREIGN PATENT DOCUMENTS

| | | |
|---|---|---|
| DE | 102010032251 | 1/2012 |
| DE | 102012106096 | 5/2014 |

*Primary Examiner* — Jorge Leon, Jr.
(74) *Attorney, Agent, or Firm* — Von Rohrscheidt Patents

(57) ABSTRACT

A hydraulic valve for a cam phaser, the hydraulic valve including a bushing element, including a longitudinal channel, a pressure medium connection that is arranged at an end of the longitudinal channel, three hydraulic connections that originate from the longitudinal channel, and a pressure balanced hollow piston that is arranged axially moveable within the longitudinal channel, characterized in that the hydraulic valve includes a check valve at the pressure medium connection and a cam phaser including a stator and a rotor that is rotatable relative to the stator between a first end position and a second end position for adjusting a cam shaft of an internal combustion engine and a hydraulic valve for controlling a rotation of the rotor.

11 Claims, 2 Drawing Sheets

(56) References Cited

U.S. PATENT DOCUMENTS

| | | | |
|---|---|---|---|
| 2009/0159024 A1* | 6/2009 | Paul | F01L 1/34409 123/90.15 |
| 2009/0159829 A1* | 6/2009 | Hoppe | F01L 1/34 251/337 |
| 2009/0178635 A1* | 7/2009 | Takenaka | F01L 1/3442 123/90.17 |
| 2011/0132303 A1 | 6/2011 | Puetz et al. | |
| 2012/0055427 A1 | 3/2012 | Chen et al. | |
| 2012/0060787 A1* | 3/2012 | Chang | F01L 1/34 123/188.4 |
| 2013/0118622 A1* | 5/2013 | Patzold | F01L 1/3442 137/855 |

* cited by examiner

HYDRAULIC VALVE AND CAM PHASER

RELATED APPLICATIONS

This application is a continuation of International application PCT/EP2014/055232 filed on Mar. 17, 2014 claiming priority from German patent application DE 10 2013 104 573.1 filed on May 5, 2013, both of which are incorporated in their entirety by this reference.

FIELD OF THE INVENTION

The invention relates to a hydraulic valve for a cam phaser, the hydraulic valve including a bushing element with a longitudinal channel, a pressure medium connection arranged at one end of the longitudinal channel, and hydraulic connections originating from the longitudinal channel and a pressure balanced hollow piston arranged axially moveable within the longitudinal channel and a cam phaser.

BACKGROUND OF THE INVENTION

The German patent application DE 10 2012 106 096.7 discloses a cam phaser with a hydraulic valve which includes a bore hole with shoulders and operating connections originating from the bore hole with shoulders, wherein a pressure balanced hollow piston is arranged axially moveable within the bore hole and moveable with a sealing tolerance with a first outer diameter within a bore hole section wherein the hollow piston includes an enveloping surface with a large outer diameter adjacent to the first outer diameter in an axial portion of the first operating connection and an enveloping surface with a small outer diameter in the portion of the other operating connection, wherein a respective inlet edge and a respective outlet edge originate from the two enveloping surfaces wherein the two inlet edges are oriented away from each other and the outlet edges are oriented towards each other so that a supply pressure introduced into a cavity of the hollow piston is provided on one side at a projected circular surface which is formed by the small outer diameter so that a force is provided in an axial direction, whereas the supply pressure is provided on one side at a projected annular surface which is formed by the large outer diameter minus the first outer diameter in order to provide a cam phaser with a hydraulic valve where the two operating connections are adjacent to the pressure medium connection on a common axial side.

Further information regarding features of the present invention can be derived from the German patent application DE 10 2012 106 096.7 which is incorporated in its entirety by this reference. Teachings of this patent application are incorporated into the instant document in their entirety. Features of this application are features of the instant document.

BRIEF SUMMARY OF THE INVENTION

It is an object of the invention to improve a hydraulic valve of the general type recited supra from a configuration and/or a functional point of view. In particular pressure loading hydraulic connections of the hydraulic valve shall also be facilitated when no operating pressure is applied to the pressure medium connection. In particular a rotor of the cam phaser shall be supportable in an end position without an operating pressure being supplied at the pressure medium connection. In particular a back flow through the pressure medium connection shall be prevented. In particular a pressure generation requirement shall be reduced. In particular a fuel consumption of a motor vehicle shall be reduced. In particular contamination of the hydraulic valve and/or of the cam phaser shall be prevented. In particular a compact configuration shall be provided. In particular a configuration shall be provided that integrates well. In particular an increase of a flow through resistance shall be limited.

The object is achieved with a hydraulic valve for a cam phaser, the hydraulic valve including a bushing element with a longitudinal channel wherein a pressure medium connection is arranged at one end of the longitudinal channel and wherein hydraulic connections originate from the longitudinal channel and a pressure balanced hollow piston is arranged axially moveable within the longitudinal channel wherein the hydraulic valve includes a check valve at the pressure medium connection.

The hydraulic valve can be used to control an adjustment of a cam phaser. The hydraulic valve can include a first operating connection. The hydraulic valve can include a second operating connection. The hydraulic valve can include a tank connection. The hydraulic valve can be actuatable by an electromagnetic actuator. The hydraulic valve can be a 4/2-way valve. The hydraulic valve can be a proportional valve. The hydraulic valve can include a longitudinal axis.

The bushing element can be hollow cylindrical. The bushing element can have a longitudinal axis. The bushing element can have a radially inner surface. The radially inner surface of the bushing element can form the longitudinal channel. The longitudinal channel can extend along the longitudinal axis. The longitudinal channel can include a first end and a second end. The longitudinal channel can include a first axial opening and a second axial opening. The pressure medium connection can be an axial connection. The hydraulic connections can have axes that are perpendicular to the longitudinal axis. The hydraulic connections can be radial connections. At least one hydraulic connection can be an operating connection. An operating connection can be configured for a flow through in both flow through directions. At least one hydraulic connection can be a tank drain. The hollow piston can be moveable in an extension of the longitudinal axis. The hollow piston can have axial pressure surfaces. The hollow piston can have first pressure surfaces which are oriented towards a first end of the longitudinal channel. The hollow piston can have second pressure surfaces that are oriented towards the second end of the longitudinal channel. A combined surface of the first pressure surfaces can correspond at least approximately to a combined surface of the second pressure surfaces. Thus, the hollow piston is pressure balanced. The check valve can be arranged at one end of the longitudinal channel. The check valve can be arranged at an axial opening of the longitudinal channel.

The bushing element can have a protrusion at its radial inside, wherein the protrusion forms an axial stop for the check valve. The bushing element can have a recess on its radial inside wherein the recess is used for attaching the check valve. The recess can be groove shaped. The recess can form an undercut contour of the bushing element.

The check valve can open in an inlet direction and close in an outlet direction. The inlet direction can be oriented into the longitudinal channel from an outside. The outlet direction can be directed from the longitudinal channel towards an outside. The check valve can be openable and/or closable self-acting as a function of a pressure medium flow.

The check valve can be configured as an insert arranged at a pressure medium connection side end of the longitudinal channel. The check valve can be arranged essentially radially within the longitudinal channel. The check valve can be arranged essentially radially within the longitudinal channel. The check valve can protrude axially beyond the bushing. The check valve can form a section of an outer contour of the hydraulic valve. The check valve can be arranged with a radially outer surface at a surface of the longitudinal channel. The check valve can be connected in a form locking manner with the bushing element. The check valve can be snap locked into the bushing element. The check valve can be arranged at the bushing element in a sealing manner or in a sealed manner. The check valve can be joined with the bushing element in an axial direction.

The check valve can include a sleeve shaped carrier, a valve seat plate and at least one blocking element that is moveable between an open position and a closed position The carrier can have a cylindrical shape. The carrier can have annular shape. The carrier can have a radially interior surface. The radially interior surface can have advantageous flow properties. The carrier can have a radially exterior surface. The radially exterior surface can be contoured adapted to the bushing element. The carrier can include an undercut contour on a radial outside. The undercut contour of the carrier can be in engagement with the corresponding undercut contour of the bushing element. The undercut contour of the carrier can be configured shaped as an engagement lug. When joining the check valve with the bushing element the undercut contour of the carrier can move in a spring elastic manner in a radial direction and can interlock with the undercut contour of the bushing element. The carrier can be made from a plastic material.

The valve seat plate can have plural pass through openings which can be closable in the closed position using the at least one blocking element. The valve seat plate can form a valve seat for the at least one blocking element. The valve seat plate can be disc shaped. The valve seat plate can have two axial side surfaces. The valve seat plate can be in axial contact with a radially interior protrusion of the bushing element with an axial side surface of the valve seat plate. The carrier can contact an axial side surface of the valve seat plate in the axial direction. Thus, the valve seat plate can be axially supported in a form locking manner. The pass through openings can be configured as bore holes. The pass through openings can be arranged in a circular pattern. The pass through openings can terminate respectively towards an axial side surface with a rectangular edge. The pass through openings can terminate respectively towards an axial side surface with an inclined edge. The terminations of the pass through openings on a side of the blocking element can be adapted to the at least one blocking element. The valve seat plate can be made from metal. The pass through openings can be stamped. The pass through opening can be bored. The pass through openings can respectively include a circumferential boundary. At the boundaries the valve seat plate can be bent away from the respective at least one blocking element.

The at least one blocking element can have a spherical shape. The check valve can include plural, in particular 3-6 spherically shaped blocking elements. The at least one blocking element can be a ball. The at least one blocking element can be disc shaped. The at least one blocking element can have an annular disc shape. The check valve can include a single disc shaped blocking element. The at least one disc shaped blocking element can have a radial outer edge. The radial outer edge can be configured rounded. This facilitates moving the at least one blocking element.

The check valve can include a stop for the at least one blocking element in an open position. The stop can be arranged at the valve seat plate. The stop can have a shape that envelops the at least one blocking element from a radial inside. The stop can be connected with the valve seat plate at a radial inside of the blocking elements. The stop can be connected with the valve seat plate in a friction locking, form locking and/or bonded manner. The stop can have a shape that envelops the at least one blocking element from a radial outside. The stop can be connected with the valve seat plate on a radial outside of the blocking elements. The stop can be formed by a protrusion at the bushing. The stop can be formed by an inner bushing that is fixated at the bushing element.

A filter can be arranged at the heck valve. The filter can be bonnet shaped. Thus, the filter can have a large surface with reference to a diameter of the longitudinal channel. Thus, clogging the filter is made more difficult.

Furthermore the object of the invention is achieved by a cam phaser with a stator and a rotor that is rotatable relative to the stator between a first end position and a second end position for adjusting a cam shaft of an internal combustion engine wherein the cam phaser includes a hydraulic valve of the type recited supra for controlling a rotation of the rotor.

The actuator can be a cam phaser. The internal combustion engine can include a drive shaft like e.g. a crank shaft. The internal combustion engine can include at least one cam shaft. The internal combustion engine can include valves.

The at least one cam shaft can be used for actuating the valves. The internal combustion engine can be used for driving the motor vehicle. The cam phaser can be used for arrangement in a valve train of the internal combustion engine between the drive shaft and the at least one cam shaft. The cam phaser can be used for adjusting a relative rotational position between the drive shaft and the at least one cam shaft. The cam phaser can be used for phasing the cam shaft. The cam phaser can be used for adjusting valves timing. The cam phaser can be used for an adjustment in a direction early and/or late. "Early" can mean that the valves of the internal combustion engine are opened and/or closed early with respect to a rotational position of the drive shaft. "Late" can mean that the valves of the internal combustion engine are opened and/or closed late with respect to a rotational position of the drive shaft. The cam phaser can have a rotational axis about which the stator and the rotor are rotatable together and/or relative to each other.

"Can" designates in particular optional features of the invention. Therefore there is a respective embodiment of the invention which includes the respective feature or the respective features.

The invention facilitates pressure loading of hydraulic connections of the hydraulic valve when no operating pressure is applied to the pressure medium connection. The rotor of the cam phaser is supportable in an end position without an operating pressure being provided at the pressure medium connection. A back flow through the pressure medium connection is prevented. A pressure generation requirement is reduced. A fuel consumption of a motor vehicle is reduced. A contamination of the hydraulic valve and/or of the cam phaser is prevented. A compact arrangement is provided. An arrangement is provided that integrates well. An increase of a flow through resistance is limited. The check valve has good reaction speed. The check valve is producible with low complexity.

BRIEF DESCRIPTION OF THE DRAWINGS

Subsequently an embodiment of the invention is described in more detail with reference to drawing figures.

This description includes additional features and advantages. Particular features of this embodiment can represent general features of the invention. Features of this particular embodiment that are associated with other features can also represent individual features of the invention, wherein.

DETAILED DESCRIPTION OF THE INVENTION

Figure 1:
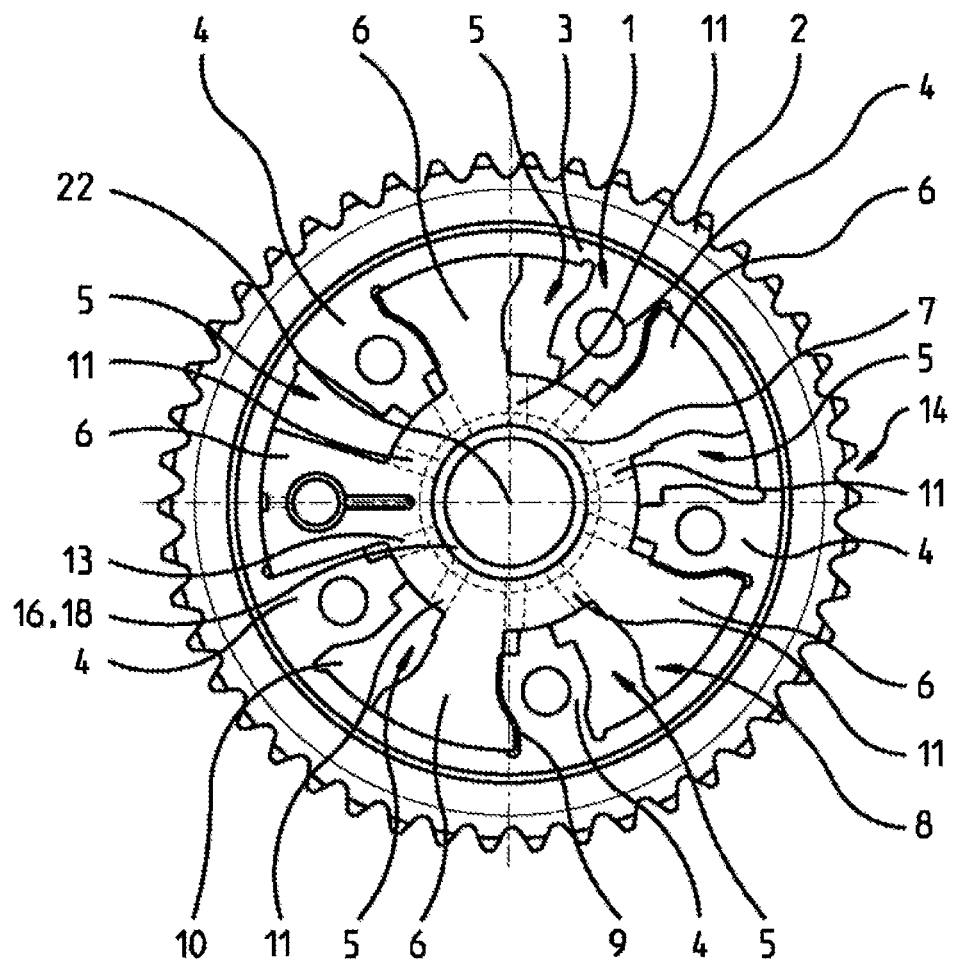
FIG. 1 illustrates a sectional view of a cam phaser.

A cam phaser 14 according to FIG. 1 is used for adjusting an angular position of a cam shaft 18 relative to a drive gear 2 during operation of an internal combustion engine in a continuously variable manner. Rotating the cam shaft 18 moves the opening and closing times of the gas control valves so that the internal combustion engine delivers optimum power at a respective speed. The cam phaser 14 includes a cylindrical stator 1 which is connected torque proof with the drive gear 2. In the embodiment the drive gear 2 is a chain sprocket over which a chain is run that is not illustrated in detail. The drive gear 2, however, can also be a timing belt cog over which a drive belt is run as a drive element. The stator 1 is operatively connected with the crank shaft through this drive element and the drive gear 2.

The stator 1 includes a cylindrical stator base element 3 at whose inside bars 4 extend in radially inward direction in uniform intervals. Intermediary cavities 5 are formed between adjacent bars 4 into which intermediary cavities a centrally arranged hydraulic valve that is illustrated in more detail in FIG. 2 introduces a pressure medium. Between adjacent bars 4 blades 6 extend which radially protrude in outward direction from a cylindrical rotor hub 7 of a rotor 8. The blades 6 divide the intermediary cavities 5 between the bars 4 respectively into two pressure cavities 9 and 10. A first pressure cavity 9 is associated with an adjustment in a direction "early", whereas a second pressure cavity is associated with an adjustment in a direction "late".

The bars 4 contact an exterior enveloping surface of the rotor hub 7 with their faces in a sealing manner. The blades 6 in turn contact the cylindrical wall of the stator base element 3 with their faces in a sealing manner.

The rotor 8 is connected torque proof with the cam shaft 18. In order to change an angular position between the cam shaft 18 and the drive gear 2 the rotor 8 is rotated relative to the stator 1. For this purpose the pressure medium in the pressure cavities 9 or 10 is pressurized as a function of the respectively intended direction of rotation, whereas the respective other pressure cavities 10 or 9 are unloaded towards the tank T. In order to pivot the rotor 8 counter clockwise into the illustrated position the hydraulic valve pressurizes an annular first rotor channel in the rotor hub 7. From the first rotor channel additional channels 11 lead into the pressure cavities 10. This first rotor channel is associated with the first operating connection A. In order to rotate the rotor 8 clockwise the hydraulic valve pressurizes a second annular rotor channel in the rotor hub 7 wherein the channels 13 open into the second annular rotor channel. The second rotor channel is associated with the second operating connection B. The two rotor channels are arranged axially offset from one another with respect to a central axis 22 so that the two rotor channels are arranged behind one another in the drawing plane 1 so that one covers the other.

The cam phaser 14 is placed onto the cam shaft 18 which is configured as a hollow tube 16. Thus, the rotor 8 is placed onto the cam shaft 18. The hollow tube 16 includes bore holes which hydraulically connect rotor channels associated with the two operating connections A, B with transversal bore holes in a bushing of the hydraulic valve.

Thus the cam phaser 14 is pivotable using the hydraulic valve.

Figure 2:
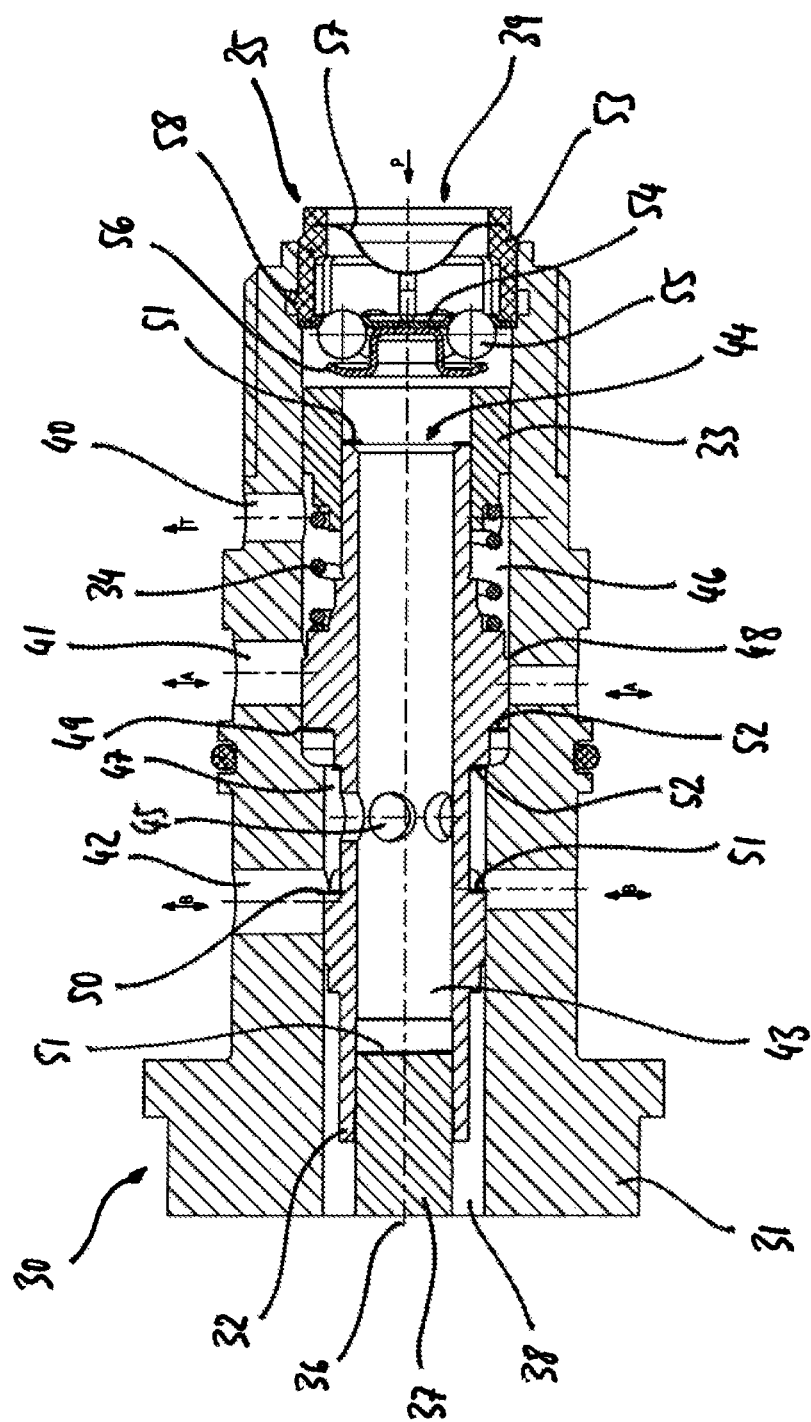
FIG. 2 illustrates a sectional view of a hydraulic valve for controlling the cam phaser.

FIG. 2 illustrates a hydraulic valve 30 for controlling a cam phaser like the cam phaser 14 according to FIG. 1. The hydraulic valve 30 includes a bushing element 31. The hydraulic valve 30 includes a hollow piston 32. The hydraulic valve 30 includes a support element 33. The hydraulic valve 30 includes a spring 34. The hydraulic valve 30 includes a check valve 35. The hydraulic valve 30 includes a longitudinal axis 36. The hollow piston 32 is axially moveable within limits relative to the bushing element 31 between a first end position and a second end position. The hollow piston is loaded by the spring 34 in a direction of the first end position. An actuator 37 is used for loading the hollow piston 32 against a force of the spring 34 in a direction towards the second end position. The hydraulic valve 30 includes a pressure connection P, a tank connection T, a first operating connection A and a second operating connection B. The operating connections A, B are used for hydraulically connecting with the pressure cavities of a cam phaser like e.g. pressure cavities 9, 10 of the cam phaser according to FIG. 1.

The bushing element 31 includes a center longitudinal channel 38. The longitudinal channel 38 extends along the longitudinal axis 36. The longitudinal channel 38 includes an axial opening 39. The longitudinal channel 38 has a first section with a larger inner diameter and a second section with a smaller inner diameter. The first section is arranged at a side of the longitudinal channel 38 where the opening 39 is arranged. The longitudinal channel 38 has a shoulder between the first section and the second section. The pressure connection P of the hydraulic valve 30 is associated with the opening 39. The bushing element 31 includes transversal channels 40, 41, 42. The transversal channels 40, 41 are arranged at the first section of the longitudinal channel 38. The tank connection T of the hydraulic valve 30 is associated with the transversal channel 40. The first operating connection A of the hydraulic valve 30 is associated with the transversal channel 41. The transversal channel 42 is arranged at the second section of the longitudinal channel 38. The second operating connection B of the hydraulic valve 30 is associated with the transversal channel 42. Viewed from the pressure connection P the tank connection T is arranged next in the axial direction followed by the first operating connection A, followed by the second operating connection B.

A groove for receiving a seal is arranged at a radial outside at the bushing element 31. The groove is arranged in axial direction between the transversal channels 41, 42. At an end associated with the pressure connection P the bushing element 31 has an external thread. At the opposite end the bushing element 31 has a collar section.

The hollow piston 32 is arranged within the bushing element 31. The hollow piston 32 includes a central longitudinal channel 43. The longitudinal channel 43 extends along the longitudinal axis 36. The longitudinal channel 43 includes an axial opening 44. The hollow piston 32 includes transversal channels like e.g. 45. The hollow piston 32 has different diameters on a radial outside. The hollow piston 32 has an exterior diameter with plural shoulders. The hollow piston 32 has a first section whose exterior diameter corresponds to an inner diameter of the first section of the longitudinal channel 38 of the bushing element 31. The first section of the hollow piston 32 is shaped as an annular bar.

The hollow piston 32 is supported sealed tight with its first section at the first section of the longitudinal channel 38 of the bushing element 31. The hollow piston 32 has a second section whose exterior diameter corresponds to an interior diameter of the second section of the longitudinal channel 38 of the bushing element 31. The second section of the hollow piston 32 has an annular bar shape. The hollow piston 32 is supported sealed tight with its second section at the second section of the longitudinal channel 38 of the bushing element 31.

At its end oriented towards the opening 44 the hollow piston 32 has a section with an exterior diameter that is smaller compared to the diameter of the first section. A shoulder is formed between the sections wherein the shoulder is used as an axial contact surface for the spring 34. A first annular cavity 46 is formed between the sections. Between the first section and the second section the hollow piston 32 has a section with an exterior diameter that is smaller than the diameter of the second section. Between the first section and the second section a second annular cavity 47 is formed which is connected by the transversal channels 45 with the longitudinal channel 43.

The hollow piston 32 includes control edges 48, 49, 50. The control edges 48, 49 are arranged at the first section of the hollow piston 32. The control edges 48, 49 are oriented away from each other in the axial direction. The control edges 48, 49 correspond to the transversal channel 41 of the bushing element 31. The control edge 50 is arranged at the second section of the hollow piston 32. The control edge 50 is oriented axially opposite to the control edge 49. The control edge 50 corresponds to the transversal channel 42 of the bushing element 31.

The hollow piston 32 includes first pressure surfaces 51 and second pressure surfaces 52. The pressure surfaces 51, 52 are axially oriented surfaces. The first pressure surfaces 51 and the second pressure surfaces 52 are oriented towards each other. The first pressure surfaces 51 have a combined surface which corresponds to a combined surface of the second pressure surfaces. Thus, the hollow piston is pressure balanced. A first pressure surface 51 is arranged at an end of the hollow piston 32 at which the opening 44 is arranged. A first pressure surface 51 is arranged at the second section of the hollow piston 32 adjacent to the control edge 50 and oriented towards the second annular cavity 47. A first pressure surface 51 is formed at the closed end of the longitudinal channel 43. A second pressure surface 52 is arranged at the first section of the hollow piston 32 adjacent to the control edge 49 and oriented towards the second annular cavity 47. A second pressure surface 52 is formed by a shoulder between the first section and the second section of the hollow piston 32.

The support element 33 is bushing shaped. The support element 33 is arranged in the longitudinal channel 38 of the bushing element 31. The support element 33 is arranged at a side oriented towards the opening 39 of the longitudinal channel 38 axially adjacent to the transversal channel 40. The support element 33 is fixated at a bushing element 31. The support element 33 is pressed into the bushing element 31. The spring 34 is supported at the support element 33. The spring 34 is a compression coil spring. Through an adapted positioning the support element 33 in the bushing element 31 a spring preload is adjustable. The hollow piston 32 is connected with the actuator 37 at an end of the hollow piston 32 that is opposite to the opening 44. The actuator is an electromagnetic actuator with a push rod which is connected with the hollow piston 32. The push rod is pressed into the hollow piston 32. The push rod closes the longitudinal channel 43 of the hollow piston 32 at one end. The push rod forms a first pressure surface 51 with its face oriented towards the longitudinal channel. The hollow piston 32 is axially moveable against a force of the spring 34 using the actuator 37 in order to control a through flow between the connections P, T, A, B of the hydraulic valve.

In the first end position the hydraulic piston 32 is moved to the left with respect to FIG. 2. In the first end position of the hollow piston 32 a pass through is formed between the opening 39 and the transversal channel 42. In the first end position the pressure connection P and the second operating connection B of the hydraulic valve 30 are connected with each other in a fluid conducting manner and the second operating connection B can be loaded with a hydraulic pressure. In the second end position the hollow piston 32 is moved to the right with respect to FIG. 2. In the second end position of the hollow piston 32 a pass through is formed between the opening 39 and the transversal channel 41. In the second end position the pressure connection P and the first operating connection A of the hydraulic valve 30 are connected with each other in a fluid conducting manner and the first operating connection A can be loaded with a hydraulic pressure.

The check valve 35 is arranged in the opening 39 of the longitudinal channel 38 of the bushing element 31. The check valve 35 is used for facilitating a flow through from the pressure connection P to the operating connections A, B and to block a back flow from the operating connections A, B to the pressure connection P.

The check valve 35 includes an axially inner end and an axially outer end. The check valve 35 is configured as an insert that is arranged in the opening 39. The check valve 35 includes a carrier 53. The check valve 35 includes a valve seat plate 54. The check valve 35 includes blocking elements like e.g. 55. The check valve 35 includes a stop element 56 for the blocking elements 55. The check valve 35 includes a filter 57.

The carrier 53 has a bushing shape. The carrier 53 is a plastic element. The carrier 53 includes engagement hooks like e.g. 58 on an axial inside. The carrier 53 is interlocked with its engagement hooks 58 at a corresponding undercut section of the bushing element 31 and thus axially fixated. The undercut section of the bushing element 31 is configured as an annular groove. The carrier 53 has an exterior diameter which corresponds to a local inner diameter of the longitudinal channel 38 and is thus fixated in a radial direction.

The valve seat plate 54 has a circular disc shape. The valve seat plate is arranged at an axial inner end of the carrier 53. The valve seat plate 54 is fixated axially between the carrier 53 and a shoulder of the bushing element 31. The valve seat plate 54 includes an exterior diameter which corresponds to a local inner diameter of the longitudinal channel 38 and is thus fixated in a radial direction. The valve seat plate 54 includes circular pass through openings that are evenly distributed over a bore hole circle. The pass through openings respectively include an edge that is bent towards an axially exterior end.

A blocking element like e.g. 55 is associated with each pass through opening of the valve seat plate 54. The blocking elements 55 are spheres. The pass through openings with their curved edges are geometrically adapted to the blocking elements 55. The edges of the pass through openings respectively form a seat for the blocking elements 55.

The stop element 56 has a hat shape and has a brim section. The stop element 56 is arranged at the valve seat plate 54 radially within the passthrough openings. The stop element 56 is fixated at the valve seat plate 54. The brim section of the stop element 56 reaches around the blocking elements 55 from a radial inside. The brim section of the stop element 56 is arranged axially offset from the valve seat plate 54 so that the blocking elements 55 are moveable between a blocking position in which the blocking elements 55 close the pass through openings and a release position in which the blocking elements release the pass through openings wherein the blocking elements are safely supported during the movement. A movement of the blocking elements is caused by the fluid during operation of the hydraulic valve 30.

The filter 57 is bonnet shaped. The filter 57 is arranged at an axial outer end of the check valve 35. Thus the filter 57 is arranged upstream of the opening 39. In the axial direction the check valve 35 protrudes beyond the bushing element 31 with its carrier 53 and thus forms a section of an outer contour of the hydraulic valve 30.

REFERENCE NUMERALS AND DESIGNATIONS 1 stator
2 drive gear
3 stator base element
4 bar
5 intermediary space
6 blade
7 rotor hub
8 rotor
9 pressure cavity
10 pressure cavity
11 channel
13 channel
14 cam phaser
16 hollow tube
18 cam shaft
22 central axis
30 hydraulic valve
31 bushing element
32 hollow piston
33 support element
34 spring
35 check valve
36 longitudinal axis
37 actuator
38 longitudinal channel
39 opening
40 transversal channel
41 transversal channel
42 transversal channel
43 longitudinal channel
44 opening
45 transversal channel
46 annular cavity
47 annular cavity
48 control edge
49 control edge
50 control edge
51 pressure surface
52 pressure surface
53 carrier
54 valve seat plate
55 blocking element
56 stop element
57 filter
58 engagement hook

What is claimed is:

1. A hydraulic valve for a cam phaser, the hydraulic valve, comprising:
    a bushing element, including
    a longitudinal channel,
    a pressure medium connection that is arranged at an end of the longitudinal channel,
    a first hydraulic connection, a second hydraulic connection and a third hydraulic connection that originate from the longitudinal channel, and
    a pressure balanced hollow piston that is arranged axially moveable within the longitudinal channel,
    wherein the hydraulic valve includes a check valve at the pressure medium connection,
    wherein the check valve includes a sleeve shaped carrier, a valve seat plate and at least one blocking element that is movable between an open position and a closed position, and
    wherein the valve seat plate has plural pass through openings which are closable by the at least one blocking element in a closed position.

2. The hydraulic valve according to claim 1, wherein the check valve opens in an inlet direction and closes in an outlet direction.

3. The hydraulic valve according to claim 1, wherein the check valve is configured as an insert that is arranged at an end of the longitudinal channel which end is oriented towards the pressure medium connection.

4. The hydraulic valve according to claim 1, wherein the at least one blocking element has a spherical shape.

5. The hydraulic valve according to claim 1, wherein the at least one blocking element has a disc shape.

6. The hydraulic valve according to claim 1, wherein the check valve has a stop for the at least one blocking element in the open position.

7. The hydraulic valve according to claim 6, wherein the stop is arranged at the valve seat plate.

8. The hydraulic valve according to claim 6, wherein the stop is formed by a protrusion arranged at the bushing element.

9. The hydraulic valve according to claim 1, wherein a filter is arranged at the check valve.

10. The hydraulic valve according to claim 1, wherein the check valve is connected in a form locking manner with the bushing element.

11. A cam phaser including a stator and a rotor that is rotatable relative to the stator between a first end position and a second end position for adjusting a cam shaft of an internal combustion engine, wherein the cam phaser includes a hydraulic valve according to claim 1 for controlling a rotation of the rotor relative to the stator.

* * * * *